(12) United States Patent
Mikoshiba et al.

(10) Patent No.: US 11,795,557 B2
(45) Date of Patent: Oct. 24, 2023

(54) ELECTROCHEMICAL REACTION DEVICE

(71) Applicant: KABUSHIKI KAISHA TOSHIBA, Minato-ku (JP)

(72) Inventors: Satoshi Mikoshiba, Yamato (JP); Asahi Motoshige, Ota (JP); Ryota Kitagawa, Setagaya (JP); Akihiko Ono, Kita (JP); Yusuke Kofuji, Yokohama (JP); Yuki Kudo, Yokohama (JP); Masakazu Yamagiwa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 82 days.

(21) Appl. No.: 16/811,716

(22) Filed: Mar. 6, 2020

(65) Prior Publication Data

US 2021/0079543 A1 Mar. 18, 2021

(30) Foreign Application Priority Data

Sep. 17, 2019 (JP) ................................. 2019-168885

(51) Int. Cl.
*C25C 3/20* (2006.01)
*C25B 15/02* (2021.01)
(Continued)

(52) U.S. Cl.
CPC ............... *C25B 15/02* (2013.01); *C25B 1/00* (2013.01); *C25B 1/04* (2013.01); *C25B 3/25* (2021.01);
(Continued)

(58) Field of Classification Search
CPC .. C25B 3/25; C25B 3/26; C25B 15/02; C25B 9/73; C25B 9/77; C25B 9/19; C25B 1/00; C25B 1/04
See application file for complete search history.

(56) References Cited

U.S. PATENT DOCUMENTS 4,952,298 A * 8/1990 Bouche-Pillon ........ C25B 15/02
204/228.3
2008/0223727 A1* 9/2008 Oloman ................ C25B 11/044
205/413

(Continued)

FOREIGN PATENT DOCUMENTS

CN 1037553 A 11/1989
CN 101657568 A 2/2010
(Continued)

OTHER PUBLICATIONS

Endrödi, B., et al., "Continuous-flow electroreduction of carbon dioxide", Progress in Energy and Combustion Science, vol. 62, Jun. 13, 2017, XP085135284, pp. 133-154.
(Continued)

*Primary Examiner* — Zulmariam Mendez
(74) *Attorney, Agent, or Firm* — Oblon, McClelland, Maier & Neustadt, L.L.P.

(57) ABSTRACT

An electrochemical reaction device includes: a first reactor including a first room and a second room, the first room being configured to store a gas containing carbon dioxide or a first electrolytic solution containing carbon dioxide, and the second room being configured to store a second electrolytic solution containing water; a cathode disposed in the first room, the cathode being configured to reduce the carbon dioxide and thus produce a reduction product; an anode disposed in the second room, the anode being configured to oxidize the water and thus produce an oxidation product; a first pressure adjuster configured to adjust pressure in the first room; a temperature detector configured to detect a temperature in the first reactor to form a detection signal; and a controller configured to control the pressure adjuster in accordance with the detection signal from the temperature detector.

19 Claims, 5 Drawing Sheets

(51) Int. Cl.
  *C25B 9/19* (2021.01)
  *C25B 1/00* (2021.01)
  *C25B 3/25* (2021.01)
  *C25B 9/77* (2021.01)
  *C25B 9/73* (2021.01)
  *C25B 1/04* (2021.01)

(52) U.S. Cl.
  CPC .............. *C25B 9/19* (2021.01); *C25B 9/73* (2021.01); *C25B 9/77* (2021.01)

(56) References Cited

U.S. PATENT DOCUMENTS

| | | | |
|---|---|---|---|
| 2009/0246572 A1* | 10/2009 | Dahlberg | B01J 23/50 |
| | | | 429/449 |
| 2010/0276296 A1* | 11/2010 | Arnett | C25B 11/03 |
| | | | 205/337 |
| 2011/0162975 A1* | 7/2011 | Wolfowitz | C07C 1/02 |
| | | | 205/462 |
| 2012/0228147 A1* | 9/2012 | Sivasankar | C25B 1/55 |
| | | | 205/440 |
| 2013/0175181 A1 | 7/2013 | Kaczur | |
| 2013/0292257 A1 | 11/2013 | Kaczur | |
| 2015/0299873 A1 | 10/2015 | Beckett | |
| 2017/0029963 A1 | 2/2017 | Ono et al. | |
| 2017/0067171 A1 | 3/2017 | Ono et al. | |
| 2017/0183789 A1* | 6/2017 | Matthews | C08J 5/2231 |
| 2017/0241026 A1* | 8/2017 | Ono | C25B 15/08 |
| 2017/0356012 A1* | 12/2017 | Atiyeh | C12P 7/065 |
| 2018/0119296 A1* | 5/2018 | Geioushy | C25B 3/25 |
| 2018/0216243 A1* | 8/2018 | Kudo | C25B 9/73 |
| 2018/0257057 A1* | 9/2018 | Motoshige | C25B 1/55 |
| 2019/0226103 A1 | 7/2019 | Kuhl et al. | |

FOREIGN PATENT DOCUMENTS

| | | | | |
|---|---|---|---|---|
| CN | 104919088 A | | 9/2015 | |
| JP | 2015/533941 A | | 11/2015 | |
| JP | 2017-31467 A | | 2/2017 | |
| JP | 2017-48442 A | | 3/2017 | |
| KR | 10-2010-0125771 A | | 12/2010 | |
| WO | WO 2013/157097 A1 | | 10/2013 | |
| WO | 2014/046791 A1 | | 3/2014 | |
| WO | WO-2016030749 A1 | * | 3/2016 | ............ C25B 11/04 |
| WO | WO 2017/014635 A1 | | 1/2017 | |

OTHER PUBLICATIONS

Colin Oloman, et al. "Electrochemical Processing of Carbon Dioxide", ChemSusChem, 2008, 1, 14 pages.

* cited by examiner

ELECTROCHEMICAL REACTION DEVICE

CROSS-REFERENCE TO RELAYED APPLICATIONS

This application is based upon and claims the benefit of priority from Japanese Patent Application No. 2019-168885, filed on Sep. 17, 2019; the entire contents of which are incorporated herein by reference.

FIELD

Embodiments described herein relate generally to an electrochemical reaction device.

BACKGROUND

In recent years, there is a concern over depletion of fossil fuel resources such as petroleum and coal, and expectations for sustainable renewable energy increases. From the viewpoint of such energy problems, environmental problems and so on, an artificial photosynthesis technology is under development which electrochemically reduces carbon dioxide using renewable energy such as sunlight to generate a stockable chemical energy source. An electrochemical reaction device enabling the artificial photosynthesis technology includes, for example, an anode that oxidizes water ($H_2O$) to produce oxygen ($O_2$), and a cathode that reduces carbon dioxide ($CO_2$) to produce a carbon compound. The anode and the cathode of the electrochemical reaction device are generally connected to a power supply derived from renewable energy such as solar power generation, hydroelectric power generation, wind power generation, geothermal power generation or the like.

The cathode of the electrochemical reaction device is disposed, for example, to be immersed in water in which carbon dioxide is dissolved or to be in contact with water which flows through a flow path and in which carbon dioxide is dissolved. The cathode obtains reduction potential for carbon dioxide from the power supply derived from renewable energy and thereby reduces carbon dioxide to produce carbon compounds such as carbon monoxide (CO), formic acid (HCOOH), methanol ($CH_3OH$), methane ($CH_4$), ethanol ($C_2H_5OH$), ethane ($C_2H_6$), ethylene ($C_2H_4$), and ethylene glycol ($C_2H_6O_2$).

When a large amount of carbon dioxide is electrochemically reduced by using the above-described renewable energy, temperature in a reactor increases due to Joule heat. Since an amount of carbon dioxide dissolved in water depends on the temperature, utility value is lowered due to change in the amount of carbon dioxide in water. Further, there is a problem that electric power is likely to fluctuate due to change in weather, wind condition or the like and applied potential to the cathode is likely to fluctuate in accordance with the change. The Joule heat also fluctuates due to the change in the applied potential to the cathode to cause a problem that the temperature in the reactor during operation fluctuates. This becomes a factor to decrease availability and utility value of the reduction product of carbon dioxide. As a method to solve the problem, the electrochemical reaction device is experimentally operated by using a power supply such as a potentiostat capable of applying a constant potential to the cathode (three-electrode system), but this loses advantages owing to the utilization of the renewable energy and results in a problem in terms of cost and efficiency.

DETAILED DESCRIPTION

An electrochemical reaction device includes: a first reactor including a first room and a second room, the first room being configured to store a gas containing carbon dioxide or a first electrolytic solution containing carbon dioxide, and the second room being configured to store a second electrolytic solution containing water; a cathode disposed in the first room, the cathode being configured to reduce the carbon dioxide and thus produce a reduction product; an anode disposed in the second room, the anode being configured to oxidize the water and thus produce an oxidation product; a first pressure adjuster configured to adjust pressure in the first room; a temperature detector configured to detect a temperature in the first reactor to form a detection signal; and a controller configured to control the pressure adjuster in accordance with a detection signal from the temperature detector.

Electrochemical reaction devices in embodiments will be described hereinafter with reference to the drawings. Substantially the same components are denoted by the same reference signs and explanation thereof may be omitted in some cases in the embodiments described below. The drawings are schematic, and a relationship between a thickness and a planar size, thickness proportions of the respective portions, and the like are sometimes different from actual ones.

First Embodiment

Figure 1:
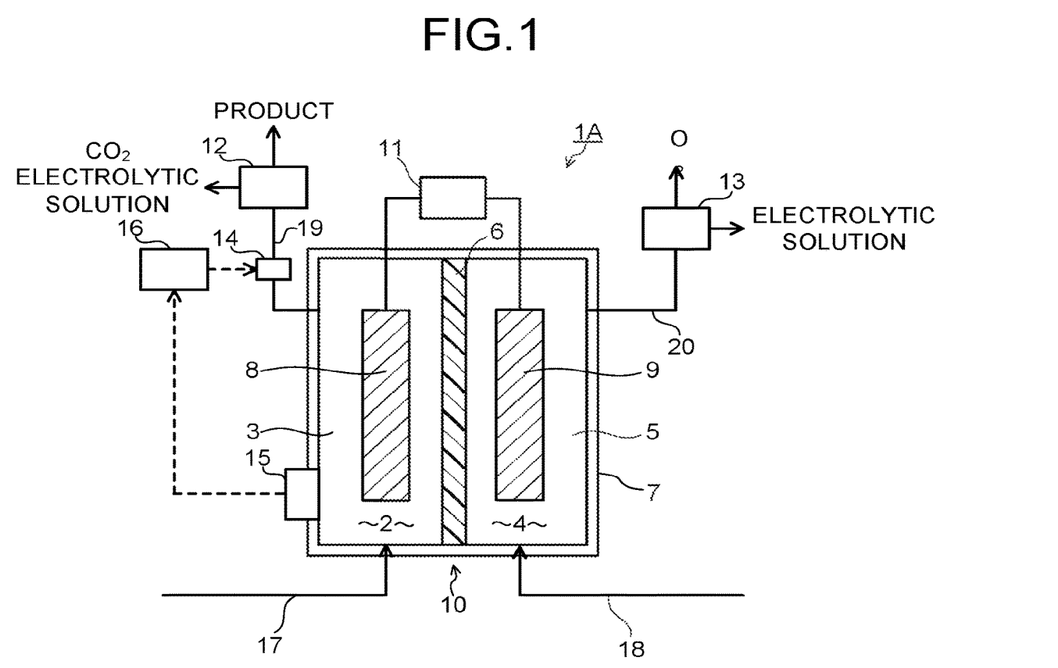
FIG. 1 is a diagram illustrating an electrochemical reaction device 1A.

FIG. 1 is a diagram illustrating an electrochemical reaction device 1A. The electrochemical reaction device 1A includes: an electrochemical reaction cell 10 including a first reactor 7 including a first room 3 configured to store a first electrolytic solution 2 containing carbon dioxide, a second room 5 configured to store a second electrolytic solution 4 containing water, and a diaphragm 6 configured to divide between the first room 3 and the second room 5, a cathode 8 disposed in the first room 3 and configured to produce a reduction product by reducing carbon dioxide, and an anode 9 disposed in the second room 5 and configured to produce an oxidation product by oxidizing water; a power supply 11 connected to the cathode 8 and the anode 9; a first separation unit 12 configured to separate the reduction product produced at the first room 3 from the first electrolytic solution 2; a second separation unit 13 configured to separate the oxidation product produced at the second room 5 from the second electrolytic solution 4; a pressure adjuster 14 configured to adjust pressure in the first room 3; a temperature detector 15 configured to detect temperature in the first room 3; and a controller 16 configured to control the pressure adjuster 14 based on a detection signal of the temperature detector 15.

The first reactor 7 has the first room 3 and the second room 5 divided by the diaphragm 6 capable of moving ions such as hydrogen ions ($H^+$) and hydroxide ions ($OH^-$). The first reactor 7 may be made of a container of, for example, quartz white plate glass, polystyrol, polymethacrylate or the like. A material transmitting light may be used for a part of the first reactor 7, and a resin material may be used for the remainder. Examples of the resin material include, for example, polyetheretherketone (PEEK), polyamide (PA), polyvinylidene fluoride (PVDF), polyacetal (POM) (copolymer), polyphenyleneether (PPE), acrylonitrile-butadiene-styrene copolymer (ABS), polypropylene (PP), polyethylene (PE) and so on.

The cathode 8 is disposed in the first room 3, and the first electrolytic solution 2 is stored such that the cathode 8 is in contact with the first electrolytic solution 2. The first electrolytic solution 2 functions as a cathode solution and contains carbon dioxide as a substance to be reduced. The first electrolytic solution 2 may contain hydrogen ions, and is preferably an aqueous solution.

The anode 9 is disposed in the second room 5, and the second electrolytic solution 4 is stored such that the anode 9 is in contact with the second electrolytic solution 4. The second electrolytic solution 4 functions as an anode solution and contains water as a substance to be oxidized. The second electrolytic solution 4 may contain an aqueous solution such as an alcohol aqueous solution, an aqueous solution of an organic substance such as amine.

It is possible to change reactivity so as to change selectivity of a substance to be reduced and a proportion of a produced chemical substance by changing an amount of water and electrolytic solution components contained in the first electrolytic solution 2 and the second electrolytic solution 4. The first electrolytic solution 2 and the second electrolytic solution 4 may contain redox couples as needed. Examples of the redox couple include, for example, $Fe^{3+}/Fe^{2+}$ and $IO^{3-}/I^-$.

The first room 3 and the second room 5 may each include a space part for accommodating gas contained in a reactant and a product. To the first room 3, a first supply flow path 17 for supplying the first electrolytic solution 2 is connected, and the first separation unit 12 is further connected through a first discharge flow path 19 for discharging a fluid such as gas or liquid from the first room 3. To the second room 5, a second supply flow path 18 for supplying the second electrolytic solution 4 is connected, and the second separation unit 13 is further connected through a second discharge flow path 20 for discharging a fluid such as gas or liquid from the second room 5.

The first electrolytic solution 2 and the second electrolytic solution 4 may be electrolytic solutions containing different substances or may be electrolytic solutions containing the same substance. In a case where the first electrolytic solution 2 and the second electrolytic solution 4 contain the same substance and the same solvent, the first electrolytic solution 2 and the second electrolytic solution 4 may be regarded as one electrolytic solution. Besides, the pH of the second electrolytic solution 4 is preferably higher than the pH of the first electrolytic solution 2. This makes the hydrogen ions, the hydroxide ions and so on easy to move. Further, a liquid junction potential due to the difference in pH can effectively promote an oxidation-reduction reaction.

The first electrolytic solution 2 is preferably a solution with high absorptance of carbon dioxide. An existing form of carbon dioxide in the first electrolytic solution 2 is not always limited to a state of being dissolved therein, but carbon dioxide in an air bubble state may exist to be mixed in the first electrolytic solution 2.

Examples of the electrolytic solution containing carbon dioxide include, for example, aqueous solutions containing hydrogencarbonates and carbonates such as lithium hydrogen carbonate ($LiHCO_3$), sodium hydrogen carbonate ($NaHCO_3$), potassium hydrogen carbonate ($KHCO_3$), sodium carbonate ($Na_2CO_3$), potassium carbonate ($K_2CO_3$), and cesium hydrogen carbonate ($CsHCO_3$), phosphoric acid, boric acid, and so on. The electrolytic solution containing carbon dioxide may contain alcohols such as methanol, ethanol, and acetone, or may be an alcohol solution. The first electrolytic solution 2 may be an electrolytic solution containing a carbon dioxide absorbent that lowers a reduction potential for carbon dioxide, has high ion conductivity, and absorbs carbon dioxide.

A solution containing water, for example, an aqueous solution containing an arbitrary electrolyte may be used as the second electrolytic solution 4. The solution is preferably an aqueous solution that promotes the oxidation reaction of water. Examples of the aqueous solution containing the electrolyte include, for example, aqueous solutions containing phosphate ion ($PO_4^{2-}$), borate ion ($BO_3^{3-}$), sodium ion ($Na^+$), potassium ion ($K^+$), calcium ion ($Ca^{2+}$), lithium ion ($Li^+$), cesium ion ($C_s^+$), magnesium ion ($Mg^{2+}$), chloride ion ($Cl^-$), hydrogen carbonate ion ($HCO_3^-$), carbonate ion ($CO_3^-$), hydroxide ion ($OH^-$) and the like.

The first electrolytic solution 2 and the second electrolytic solution 4 may contain, for example, ionic liquids made of salts of cations such as imidazolium ions or pyridinium ions and anions such as $BF_4^-$ or $PF_6^-$ and in a liquid state in a wide temperature range, or aqueous solutions thereof. Examples of other electrolytic solutions include amine solutions such as ethanolamine, imidazole, and pyridine, or aqueous solutions thereof. Examples of amine include primary amine, secondary amine, tertiary amine, and the like. The electrolytic solutions may be high in ion conductivity and have properties of absorbing carbon dioxide and characteristics of lowering reduction energy.

Examples of the primary amine include methylamine, ethylamine, propylamine, butylamine, pentylamine, hexylamine and the like. Hydrocarbons of the amine may be substituted by alcohol, halogen and the like. Examples of amine whose hydrocarbons are substituted include methanolamine, ethanolamine, chloromethylamine and the like. Further, an unsaturated bond may exist. These hydrocarbons are also the same in the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine and the like. The substituted hydrocarbons may be different. This also applies to the tertiary amine. For example, examples with different hydrocarbons include methylethylamine, methylpropylamine and the like.

Examples of the tertiary amine include trimethylamine, triethylamine, tripropylamine, tributylamine, trihexylamine, trimethanolamine, triethanolamine, tripropanolamine, tributanolamine, tripropanolamine, triexanolamine, methyl diethylamine, methyldipropylamine and the like.

Examples of the cation of the ionic liquid include 1-ethyl-3-methylimidazolium ion, 1-methyl-3-propylimidazolium ion, 1-butyl-3-methylimidazole ion, 1-methyl-3-pentylimidazolium ion, 1-hexyl-3-methylimidazolium ion and the like.

A second place of the imidazolium ion may be substituted. Examples of the cation of the imidazolium ion whose second place is substituted include 1-ethyl-2,3-dimethylimidazolium ion, 1,2-dimethyl-3-propylimidazolium ion, 1-butyl-2,3-dimethylimidazolium ion, 1,2-dimethyl-3-pentylimidazolium ion, 1-hexyl-2,3-dimethylimidazolium ion and the like.

Examples of the pyridinium ion include methylpyridinium, ethylpyridinium, propylpyridinium, butylpyridinium, pentylpyridinium, hexylpyridinium and the like. In both of the imidazolium ion and the pyridinium ion, an alkyl group may be substituted, or an unsaturated bond may exist.

Examples of the anion include fluoride ion)($F^{\square}$), chloride ion ($Cl^{\square}$), bromide ion ($Br^{\square}$), iodide ion ($I^{\square}$), $BF_4^{\square}$, $PF_6^{\square}$, $CF_3COO^{\square}$, $CF_3SO_3^{\square}$, $NO_3^{\square}$, $SCN^{\square}$, $(CF_3SO_2)_3C^{\square}$, bis(trifluoromethoxysulfonyl)imide, bis(trifluoromethoxysulfonyl)imide, bis(perfluoroethylsulfonyl)imide and the like. Dipolar ions in which the cations and the anions of the ionic liquid are coupled by hydrocarbons may be used. Note that a buffer solution such as a potassium phosphate solution may be supplied to the first room 3 and the second room 5.

A membrane capable of selectively allowing the anion or the cation to pass therethrough is used for the diaphragm 6. This makes it possible to make the first electrolytic solution 2 and the second electrolytic solution 4 which are in contact with the cathode 8 and the anode 9 respectively electrolytic solutions containing different substances, and to promote the reduction reaction and the oxidation reaction depending on the difference in ionic strength, the difference in pH or the like. The diaphragm 6 can be used to separate the first electrolytic solution 2 from the second electrolytic solution 4. The diaphragm 6 may have a function of allowing part of ions contained in the first electrolytic solution 2 and the second electrolytic solution 4 where the cathode 8 and the anode 9 are respectively immersed to permeate, namely, a function of blocking one or more kinds of ions contained in the first electrolytic solution 2 and the second electrolytic solution 4. This can differ, for example, the pH or the like between the first electrolytic solution 2 and the second electrolytic solution 4.

An ion exchange membrane such as, for example, NEOSEPTA (registered trademark) of ASTOM Corporation, Selemion (registered trademark), Aciplex (registered trademark) of ASAHI GLASS CO., LTD., Fumasep (registered trademark), fumapem (registered trademark) of Fumatech GmbH, Nafion (registered trademark) being a fluorocarbon resin made by sulfonating and polymerizing tetrafluoroethylene of E.I. du Pont de Nemours and Company, lewabrane (registered trademark) of LANXESS AG, IONSEP (registered trademark) of IONTECH Inc., Mustang (registered trademark) of PALL Corporation, ralex (registered trademark) of mega Corporation, Gore-Tex (registered trademark) of Gore-Tex Co., Ltd. can be used as the diaphragm 6. Besides, the ion exchange membrane may be composed using a membrane having hydrocarbon as a basic skeleton or a membrane having an amine group in anion exchange. When the first electrolytic solution 2 and the second electrolytic solution 4 are different in pH, the electrolytic solutions can be used while stably keeping their pHs by using a bipolar membrane made by stacking a cation exchange membrane and an anion exchange membrane.

Other than the ion exchange membrane, for example, porous membranes of polymer materials such as a silicone resin, fluorine-based resins (perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), ethylene-chlorotrifluoroethylene copolymer (ECTFE) and the like), paper, and ceramics, filler filled with glass filter, agar and the like, insulating porous bodies of zeolite and oxide and the like may be used as the diaphragm 6. In particular, a hydrophilic porous membrane never causes clogging due to air bubbles and is thus preferable as the diaphragm 6.

The cathode 8 is an electrode that reduces carbon dioxide to produce a reduction product such as a carbon compound. The cathode 8 is disposed in the first room 3 and immersed in the first electrolytic solution 2 supplied to the first room 3. The cathode 8 contains a reduction catalyst for producing the reduction product such as the carbon compound by the reduction reaction of, for example, carbon dioxide. Examples of the reduction catalyst include a material that lowers activation energy for reducing carbon dioxide. In other words, a material that lowers an overvoltage when the carbon compound is produced by the reduction reaction of carbon dioxide can be cited.

The cathode 8 contains, for example, a metal material or a carbon material. For example, a metal such as gold, aluminum, copper, silver, platinum, palladium, zinc, mercury, indium, or nickel, or an alloy containing the metal and the like can be used as the metal material. For example, graphene, carbon nanotube (CNT), fullerene, ketjen black or the like can be used as the carbon material. Note that the reduction catalyst is not limited to the above but, for example, a metal complex such as a Ru complex or a Re complex, or an organic molecule having an imidazole skeleton or a pyridine skeleton may be used as the reduction catalyst. The reduction catalyst may be a mixture of a plurality of materials. The cathode 8 may have, for example, a structure having the reduction catalyst in a thin film shape, a mesh shape, a particle shape, a wire shape or the like provided on a conductive substrate.

Examples of the reduction product produced by the reduction reaction at the cathode 8 include, for example, carbon compounds such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), and ethylene glycol ($C_2H_6O_2$) though different depending on the kind or the like of the reduction catalyst. Further, at the cathode 8, a side reaction of producing hydrogen ($H_2$) by the reduction reaction of water may occur simultaneously with the reduction reaction of carbon dioxide.

The anode 9 is an electrode that oxidizes water to produce oxygen. The anode 9 is disposed in the second room 5 and immersed in the second electrolytic solution 4 supplied to the second room 5. The anode 9 contains an oxidation catalyst for producing oxygen by oxidizing water. A material that lowers activation energy for oxidizing water, in other words, a material that lowers an overvoltage when oxygen and hydrogen ions are produced by the oxidation reaction of water is used as the oxidation catalyst.

The oxidation catalyst contains metals such as, for example, ruthenium, iridium, platinum, cobalt, nickel, iron, manganese. Further, a binary metal oxide, a ternary metal oxide, a quaternary metal oxide or the like can be used. Examples of the binary metal oxide include, for example, manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O) and the like. Examples of the ternary metal oxide include, for example, Ni—Fe—O, Ni—Co—O, La—Co—O, Ni—La—O, Sr—Fe—O and the like. Examples of the quaternary metal oxide include, for example, Pb—Ru—Ir—O, La—Sr—Co—O and the like. Note that the oxidation catalyst is not limited to the above, but a metal hydroxide containing cobalt, nickel, iron, manganese or the like, or a metal complex such as a Ru complex or a Fe complex may be used as the oxidation catalyst. Further, a plurality of materials may be mixed together for use.

The anode 9 may be composed of a composite material containing both the oxidation catalyst and a conductive material. Examples of the conductive material include: for example, carbon materials such as carbon black, activated carbon, fullerene, carbon nanotube, graphene, ketjen black, diamond; transparent conductive oxides such as indium tin oxide (ITO), zinc oxide (ZnO), fluorine-doped tin oxide (FTO), aluminum-doped zinc oxide (AZO), antimony-doped tin oxide (ATO); metals such as copper (Cu), aluminum (Al), titanium (Ti), nickel (Ni), silver (Ag), tungsten (W), cobalt (Co), gold (Au); and alloys each containing at least one of the metals. The anode 9 may have a structure having, for example, the oxidation catalyst in a thin film shape, a mesh shape, a particle shape, a wire shape or the like provided on a conductive substrate. For example, a metal material containing titanium, titanium alloy, or stainless steel is used as the conductive substrate.

The power supply 11 is able to supply electric power to make the electrochemical reaction cell 10 cause the oxidation-reduction reaction, and is electrically connected to the cathode 8 and the anode 9. The electric energy supplied from the power supply 11 is used to cause the reduction reaction by the cathode 8 and the oxidation reaction by the anode 9. The power supply 11 and the cathode 8 are connected and the power supply 11 and the anode 9 are connected, for example, by wiring. Electric equipment such as an inverter, a converter, a battery may be installed between the electrochemical reaction cell 10 and the power supply 11 as needed. A drive system of the electrochemical reaction cell 10 may be a constant-voltage system or may be a constant-current system.

The power supply 11 may be a normal commercial power supply, battery or the like, or may be a power supply that supplies electric energy obtained by converting renewable energy. Examples of the power supply include a power supply that converts kinetic energy or potential energy such as wind power, water power, geothermal power, tidal power to electric energy, a power supply such as a solar cell including a photoelectric conversion element that converts light energy to electric energy, a power supply such as a fuel cell or a storage battery that converts chemical energy to electric energy, an apparatus that converts vibrational energy such as sound to electric energy, and so on. The photoelectric conversion element has a function of performing charge separation by emitted light energy of sunlight or the like. Examples of the photoelectric conversion element include a pin junction solar cell, a pn-junction solar cell, an amorphous silicon solar cell, a multijunction solar cell, a single crystal silicon solar cell, a polycrystalline silicon solar cell, a dye-sensitized solar cell, an organic thin-film solar cell, and the like. The photoelectric conversion element may be stacked on at least one of the cathode 8 and the anode 9 inside the first reactor 7.

The reduction product produced at the cathode 8 is sent through the first discharge flow path 19 to the first separation unit 12. In the first separation unit 12, carbon monoxide (CO) being a gaseous product, or formic acid (HCOOH), methane ($CH_4$), methanol ($CH_3OH$), ethane ($C_2H_6$), ethylene ($C_2H_4$), ethanol ($C_2H_5OH$), formaldehyde (HCHO), ethylene glycol ($C_2H_6O_2$) or the like being a liquid product is separated from the first electrolytic solution 2. When the reduction reaction of water being the side reaction of the reduction reaction of carbon dioxide occurs, hydrogen produced therefrom is also separated from the first electrolytic solution 2. Further, the oxidation product produced at the anode 9 is sent through the second discharge flow path 20 to the second separation unit 13. In the second separation unit 13, oxygen ($O_2$) being a gaseous product is mainly separated from the second electrolytic solution 4.

The first discharge flow path 19 is provided with the pressure adjuster 14 that adjusts the pressure in the first room 3. The pressure adjuster 14 is disposed on a back pressure side (an outlet side) of the first room 3. For example, a variable throttle, a flow rate control valve or the like is used as the pressure adjuster 14. That is, the pressure in the first room 3 can be adjusted by regulating a flow rate of a fluid (a fluid including gas and liquid) flowing through the first discharge flow path 19. The pressure in the first room 3 is preferably set to the pressure which does not liquefy carbon dioxide, and concretely, it is preferably adjusted in a range of 0.1 MPa or more and 6.4 MPa or less. If the pressure in the first room 3 is less than 0.1 MPa, reduction reaction efficiency of carbon dioxide may decrease. If the pressure in the first room 3 exceeds 6.4 MPa, carbon dioxide is liquefied and the reduction reaction efficiency of carbon dioxide may decrease.

Increasing or decreasing the pressure in the first room 3 can adjust the amount and kind of the reduction product produced at the cathode 8. That is, regulating the pressure in the first room 3 to change partial pressure of carbon dioxide being reacting species, thereby enabling regulation of the carbon dioxide amount near the cathode 8.

Figure 2:
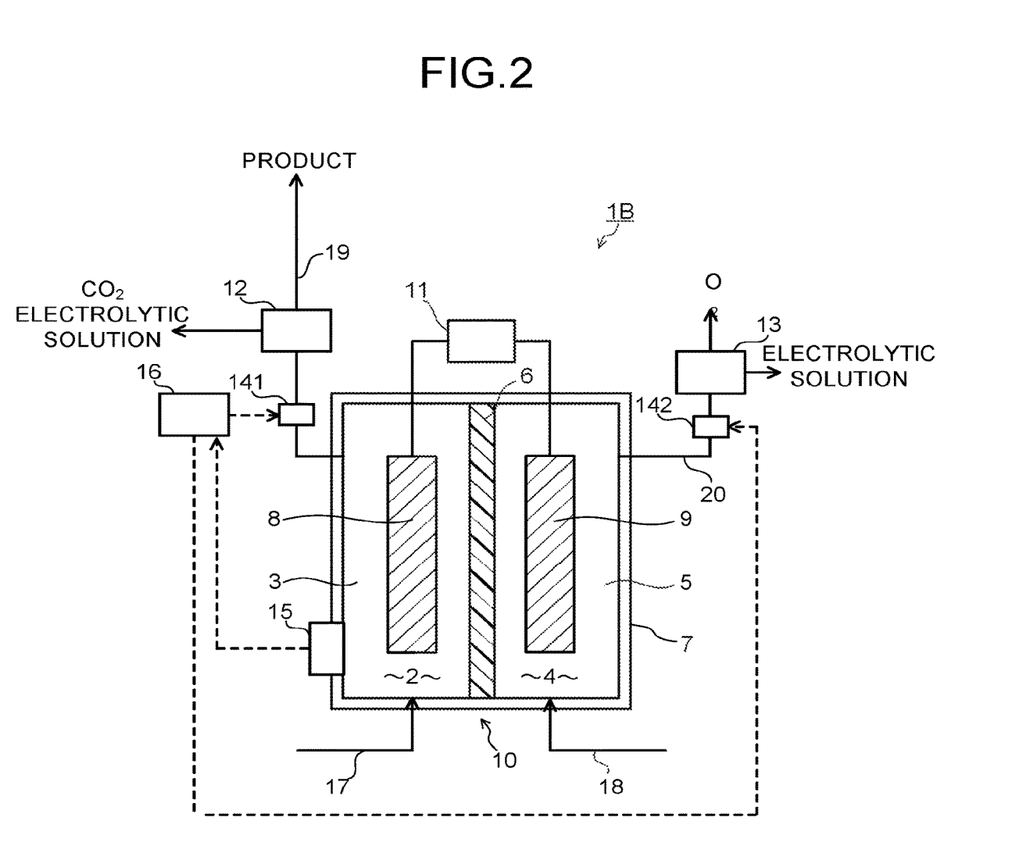
FIG. 2 is a diagram illustrating an electrochemical reaction device 1B.

FIG. 2 is a diagram illustrating an electrochemical reaction device 1B. As illustrated in FIG. 2, a first pressure adjuster 141 is disposed on a back pressure side of the first room 3 and a second pressure adjuster 142 may be additionally disposed on a back pressure side of the second room 5. The first pressure adjuster 141 is the same as the pressure adjuster 14 illustrated in FIG. 1. For example, a variable throttle, a flow rate control valve or the like is used as the second pressure adjuster 142. That is, the pressure in the second room 5 can be adjusted by regulating a flow rate of a fluid (a fluid including gas and liquid) flowing through the second discharge flow path 20. The explanation regarding the pressure adjuster 14 can be appropriately cited as other explanations regarding the first pressure adjuster 141 and the second pressure adjuster 142. Besides, the explanation of the electrochemical reaction device 1A can be appropriately cited regarding the same components as the electrochemical reaction device 1A.

The second pressure adjuster 142 is provided at the second discharge flow path 20. A differential pressure between the first room 3 and the second room 5 can be adjusted by providing the second pressure adjuster 142. This can suppress breakage or the like of the diaphragm 6 due to the differential pressure between the first room 3 and the second room 5. The difference (differential pressure) between the pressure in the first room 3 and the pressure in the second room 5 is preferably adjusted within 0.5 MPa by the first pressure adjuster 141 and the second pressure adjuster 142.

The regulation of the pressure in the first room 3 by the pressure adjuster 14 or the first pressure adjuster 141 is performed by sending a detection signal indicating temperature in the first reactor 7 detected by the temperature detector 15 to the controller 16 and controlling operation of the pressure adjuster 14 by the controller 16.

The temperature detection unit 15 is disposed at a part capable of detecting at least one of the temperature in the first reactor 7, the temperature in the first room 3, and the temperature in the second room 5. A contact type or non-contact type temperature measuring device can be used as the temperature detector 15. In a case of the contact type temperature measuring device, it can be connected to at least one of the first reactor 7, the first room 3, and the second room 5. In a case of the non-contact type temperature measuring device, the temperature may be detected by a non-contact type device such as a non-contact thermometer or a thermography and calculation using a heating value data at a cell operation time which is previously obtained by an experiment or a simulation. Further, the temperature of at least one of the first electrolytic solution 2 and the second electrolytic solution 4 discharged from the first reactor 7 may be detected to detect the temperature. The temperature detector 15 is electrically connected to the controller 16, and the controller 16 is electrically connected to the pressure adjuster 14. The temperature detector 15 outputs a detection signal to the controller 16.

The controller 16 is electrically connected to the pressure adjuster 14 and the temperature detector 15. The controller 16 receives the detection signal (data signal) from the temperature detector 15 and outputs a control signal to the pressure adjuster 14. The controller 16 previously stores a request criterion of the data signal regarding a composition and an amount of a product, and the controller 16 outputs the control signal to the pressure adjuster 14 when the request criterion is not satisfied. The controller 16 is formed of a computer such as, for example, a personal computer or a microcomputer, and arithmetically processes the data signal from the temperature detector 15 and controls operation of the pressure adjuster 14 to adjusted pressure in the first room 3.

A partial current density of a reduction product of an electrochemical reaction device largely changes due to unstable electric power supplied from renewable energy. Heat quantity of Joule heat generated at the first reactor 7 becomes large as the current density increases resulting in that the temperature in the first reactor 7 increases. When the temperature increases, there is a possibility that solubility of carbon dioxide in an electrolytic solution is lowered, Faradaic efficiency being reaction selectivity is lowered, and electrolysis efficiency indicating production efficiency of the reduction product is lowered. In such a case, control may be carried out by inputting a relationship between the lowering of the Faradaic efficiency and the lowering of the electrolysis efficiency in accordance with the temperature increase which is measured in advance to the controller 16. Normally, when the temperature increases, the control to increase the pressure is carried out. The control to lower the pressure may be carried out when the electric power supplied from the power supply 11 is lowered and the current density is lowered. When the Faradaic efficiency and the electrolysis efficiency do not change regardless whether the pressure is lowered or kept, the pressure may not be changed.

The temperature in the first reactor 7 is preferably controlled within a range from room temperature (for example, 25° C.) to 150° C. where the electrolytic solution does not evaporate. The temperature is more preferably controlled to fall within a range from 60° C. to 150° C., and further preferably controlled to be 80° C. or more and 150° C. or less. When the temperature is controlled to be less than the room temperature, energy efficiency of a total system may be lowered because a cooling device such as a chiller is required. When the temperature is higher than 150° C., water in the electrolytic solution is evaporated to increase resistance, and the electrolysis efficiency may be lowered. The current density of the cathode 8 is not particularly limited, but the current density is preferably higher to increase the production amount of the reduction product per unit area. The current density is preferably 100 mA/cm$^2$ or more and 1.5 A/cm$^2$ or less, and further preferably 300 mA/cm$^2$ or more and 700 mA/cm$^2$ or less. When the current density is less than 100 mA/cm$^2$, the production amount of the reduction product per unit area is low, and a large area is required. When the current density exceeds 1.5 A/cm$^2$, a side reaction of producing hydrogen increases to lower a reduction product concentration. When Joule heat increases according to the increase in the current density, a cooling mechanism may be provided at the first reactor 7 or in the vicinity thereof since the temperature increases to a proper temperature or more. The cooling mechanism may be achieved by either water cooling or air cooling.

Even when the temperature in the first reactor 7 is higher than the room temperature, the temperature may be controlled as it is as long as the temperature is 150° C. or less. When the electrolysis efficiency or the like is adjusted by lowering the temperature to the room temperature, energy loss becomes large.

The first reactor 7 may be formed in an integral structure where a plurality of first reactors 7 are disposed to increase a reaction amount of the reduction catalyst and the production amount of the reduction product per unit area. In a case of the integral structure where the plurality of first reactors 7 are disposed, the temperature in the first reactor 7 may increase due to a problem of radiation of Joule heat of an electrode. On the other hand, the reaction can be promoted without lowering at least one of the Faradaic efficiency and the electrolysis efficiency according to this embodiment.

The first separation unit 12 is disposed to separate the reduction product from by-products such as carbon dioxide and hydrogen. A separation method is not particularly limited, but there can be used a membrane separation method, a chemisorption method by using amine or the like, a pressure swing adsorption method, a thermal swing adsorption method, and so on. A gas/liquid separation unit which separates gas containing the reduction product from the electrolytic solution can be disposed without arranging the first separation unit 12.

The second separation unit 13 includes a gas/liquid separation tank, and it is disposed to separate produced oxygen from the electrolytic solution.

Next, operation of the electrochemical reaction device 1A will be described. Here, a case of using water and an aqueous solution containing carbon dioxide as the first electrolytic solution 2 and the second electrolytic solution 4, and mainly producing carbon monoxide by reducing carbon dioxide will be described. When a voltage of a bath voltage or higher is applied between the cathode 8 and the anode 9, an oxidation reaction of water occurs near the anode 9 which is in contact with the second electrolytic solution 4. As expressed in Expression (1) described below, the oxidation reaction of water contained in the second electrolytic solution 4 occurs, electrons are lost and oxygen ($O_2$) and hydrogen ions ($H^+$) are produced. A part of the produced hydrogen ions ($H^+$) move through the diaphragm 6 into the first electrolytic solution 2.

$$2H_2O \rightarrow 4H^+ + O_2 + 4e^- \quad (1)$$

When the hydrogen ions ($H^+$) produced on the anode 9 side reach the vicinity of the cathode 8 and electrons ($e^-$) are supplied from the power supply 11 to the cathode 8, a reduction reaction of carbon dioxide occurs. As expressed in Expression (2) described below, carbon dioxide contained in the first electrolytic solution 2 is reduced by the hydrogen ions (H$^+$) moved to the vicinity of the cathode 8 and the electrons (e$^-$) supplied from the power supply 11 to produce carbon monoxide (CO).

$$2CO_2 + 4H^+ + 4e \rightarrow 2CO + 2H_2O \quad (2)$$

Note that the product of the reduction reaction of carbon dioxide is not limited to carbon monoxide but may be a production reaction of, for example, ethanol ($C_2H_5OH$), ethylene ($C_2H_4$), ethane ($C_2H_6$), methane ($CH_4$), methanol ($CH_3OH$), acetic acid ($CH_3COOH$), propanol ($C_3H_7OH$), or the like.

The reduction reaction by the cathode 8 fluctuates depending on the temperatures of the cathode 8 and the first room 3. For example, there is a case where hydrogen gas is produced by the reduction reaction of water in addition to the above-described production reaction of carbon monoxide gas. A ratio between production amounts of carbon monoxide gas and hydrogen gas fluctuates depending on the temperatures of the cathode 8 and the first room 3, and an amount of hydrogen gas mixed in carbon monoxide gas being a main target product may increase in some cases. Besides, the kind or the like of the reduction catalyst constituting the cathode 8 is selected to make an organic compound such as ethanol, ethylene, or ethane a main target product in place of carbon monoxide gas in some cases. In such a case, the production amount of carbon monoxide increases and a production amount of the organic compound decreases depending on the temperatures of the cathode 8 and the first room 3. The fluctuations in the composition and the production amount of the reduction product in accordance with the above-described fluctuation in the temperatures of the cathode 8 and the first room 3 are detected by the temperature detector 15. Then, the pressure adjuster 14 is controlled based on the detection result by the temperature detector 15, whereby the pressure in the first room 3 is adjusted as described above. This adjusts the production amount of the reduction product, and adjusts the composition and the production amount of the reduction product to desired states. Accordingly, it becomes possible to suppress the successive fluctuations in the production amount and the composition of the reduction product of carbon dioxide due to the changes in the temperatures of the cathode 8 and the first room 3 to thereby enhance availability and utility value of the reduction product.

Second Embodiment

Figure 3:
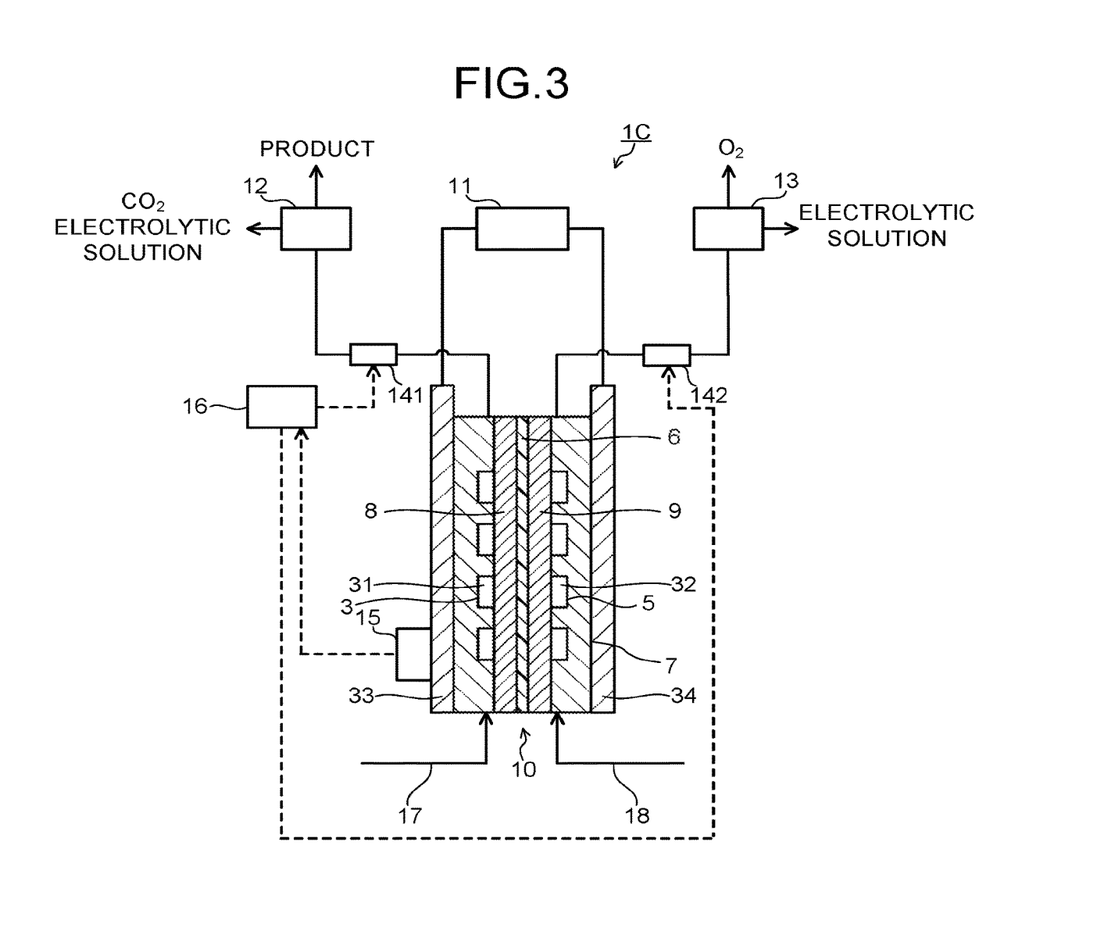
FIG. 3 is a diagram illustrating an electrochemical reaction device 1C.

FIG. 3 is a diagram illustrating an electrochemical reaction device 1C. The electrochemical reaction device 1C illustrated in FIG. 3 is different from the electrochemical reaction device 1B in the first embodiment in a contact type of gas containing carbon dioxide (simply described as $CO_2$ gas in some cases) or the first electrolytic solution 2 (cathode solution) containing carbon dioxide with the cathode 8, a contact type of the second electrolytic solution 4 (anode solution) containing water with the anode 9, and a connection mode of the cathode 8 and the anode 9 with the power supply 11. The configuration of each unit other than the above, for example, the concrete configurations of the cathode 8, the anode 9, the diaphragm 6, the first electrolytic solution 2, the second electrolytic solution 4, the power supply 11 and so on, the separation of the product, the detection of the temperature, the pressure regulation based on the detection result of the temperature and so on are the same as those in the first embodiment. Note that gas containing carbon dioxide can be used in place of the first electrolytic solution 2 containing carbon dioxide in the second embodiment. This embodiment can be appropriately combined with other embodiments.

The electrochemical reaction device 1C illustrated in FIG. 3 includes the electrochemical reaction cell 10 including the cathode 8, the anode 9, the diaphragm 6, a first flow path 31 for allowing gas containing carbon dioxide (simply described as $CO_2$ gas in some cases) or the first electrolytic solution 2 (cathode solution) containing carbon dioxide to flow therethrough, a second flow path 32 for allowing the second electrolytic solution 4 (anode solution) containing water to flow therethrough, a first current collector plate 33 electrically connected to the cathode 8, and a second current collector plate 34 electrically connected to the anode 9. The first and second current collector plates 33, 34 of the electrochemical reaction cell 10 are connected to the power supply 11. The temperature detector 15 is connected to the first room 3.

The first flow path 31 is disposed to face the cathode 8 and forms the first room 3. A non-illustrated gas or solution tank, pump, and so on are connected to the first flow path 31 and configured such that the $CO_2$ gas or the cathode solution flows through the first flow path 31 to be supplied to the cathode 8. Carbon dioxide in the $CO_2$ gas or the cathode solution passed through the cathode 8 is reduced by the cathode 8. Gas or a solution containing the reduction product of carbon dioxide is sent to the first separation unit 12. The first pressure adjuster 141 is provided between the first flow path 31 and the first separation unit 12.

The second flow path 32 is disposed to face the anode 9 and forms the second room 5. The second pressure adjuster 142 is provided between the second flow path 32 and the second separation unit 13. A non-illustrated solution tank, pump, and so on are connected to the second flow path 32 and configured such that the anode solution flows through the second flow path 32 to be supplied to the anode 9. Water in the anode solution passed through the anode 9 is oxidized by the anode 9. A solution containing an oxidation product of water is sent to the second separation unit 13.

In the electrochemical reaction device 1C, the first pressure adjuster 141 and the second pressure adjuster 142 are controlled based on a detection signal of the temperature detector 15 at the first reactor 7 including the first flow path 31, the second flow path 32, the diaphragm 6, the cathode 8, and the anode 9 to adjust pressure in the first flow path 31. This adjusts a potential of the cathode 8 to be a desired potential, and adjusts a composition and a production amount of the reduction product to desired states. Accordingly, it becomes possible to suppress the successive fluctuations in the production amount and the composition of the reduction product of carbon dioxide due to the changes in the temperatures of the first room 3 and the second room 5 to thereby enhance availability and utility value of the reduction product.

A concentration of carbon dioxide introduced into the first room 3 is preferably higher, but operation is possible at a concentration of 5% or more and 20% or less in volume percent. When the concentration of carbon dioxide is 5% or more and 20% or less in volume percent, Faradaic efficiency and electrolysis efficiency can be increased by increasing the pressure to increase partial pressure of carbon dioxide. The pressure of carbon dioxide is preferably 3 atm or more and 6.4 MPa or less. A fluid such as gas or an electrolytic solution containing carbon dioxide is introduced into the first room 3 from, for example, a discharge source discharging carbon dioxide.

A difference between the temperature of carbon dioxide introduced into the first room 3 and the temperature in the first reactor 7 is preferably within 20° C. When the temperature of the introduced carbon dioxide is lower than the temperature in the first reactor 7, the temperature in the first reactor 7 in the vicinity of an introducing part is lowered to cause nonuniform temperature in the first reactor 7, resulting in that a current density of the carbon dioxide reduction at an electrode becomes nonuniform. The electrolysis efficiency is thereby lowered in some cases. When the temperature of the introduced carbon dioxide is higher than the temperature in the first reactor 7, the temperature in the first reactor 7 increases, and cooling is required. The temperature difference is therefore further preferably within 10° C. The temperature of the carbon dioxide introduced under such a condition is preferably 80° C. or more and 140° C. or less. The temperature is further preferably 80° C. or more and 120° C. or less. Energy efficiency further improves when the temperature is 80° C. or more and 120° C. or less. When the temperature of the introduced carbon dioxide is high and the difference between the temperature in the first reactor 7 and the temperature of the introduced carbon dioxide is large, the first reactor 7 can be heated by using the heat of the introduced carbon dioxide. The total energy efficiency is thereby improved.

Figure 4:
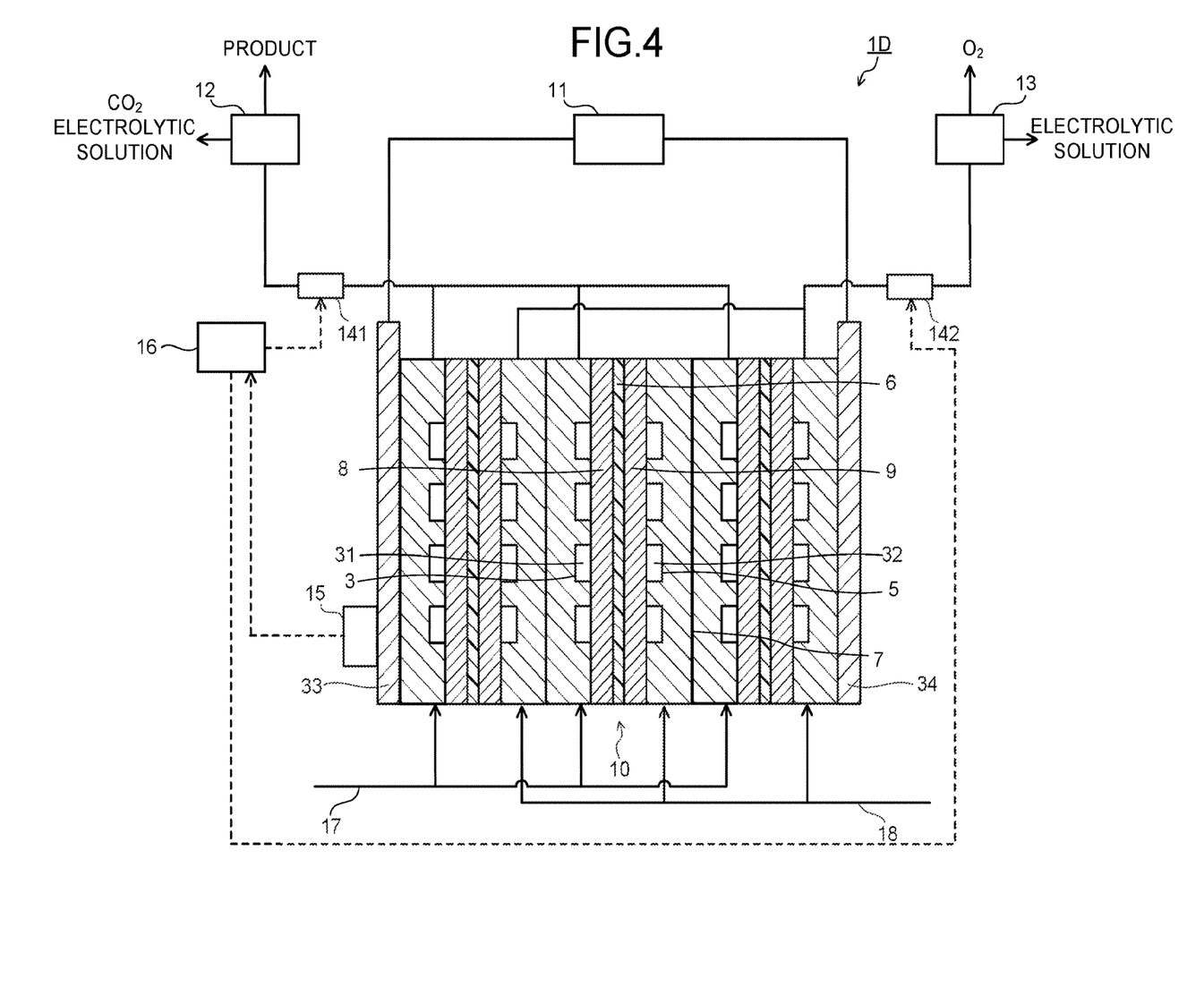
FIG. 4 is a diagram illustrating an electrochemical reaction device 1D.

FIG. 4 is a diagram illustrating an example of an electrochemical reaction device 1D. In the electrochemical reaction device 1D illustrated in FIG. 4, a plurality of first reactors 7 are disposed to be formed in an integral structure. A production amount of a reduction product per unit area can be increased by arranging the plurality of first reactors 7. The number of disposed first reactors 7 is not particularly limited, but it is preferably configured by arranging three pieces or more and 40 pieces or less per one unit, and more preferably three pieces or more and 20 pieces or less of the first reactors 7 to increase a reaction amount per unit area. When the number of the disposed first reactors 7 is less than three pieces, the reaction amount per unit area is small and the production amount cannot be largely increased. When it exceeds 40 pieces, it becomes difficult to control the temperature. The explanation of other electrochemical reaction devices such as the electrochemical reaction device 1C can be appropriately cited as other explanations of the electrochemical reaction device 1D.

Third Embodiment

Figure 5:
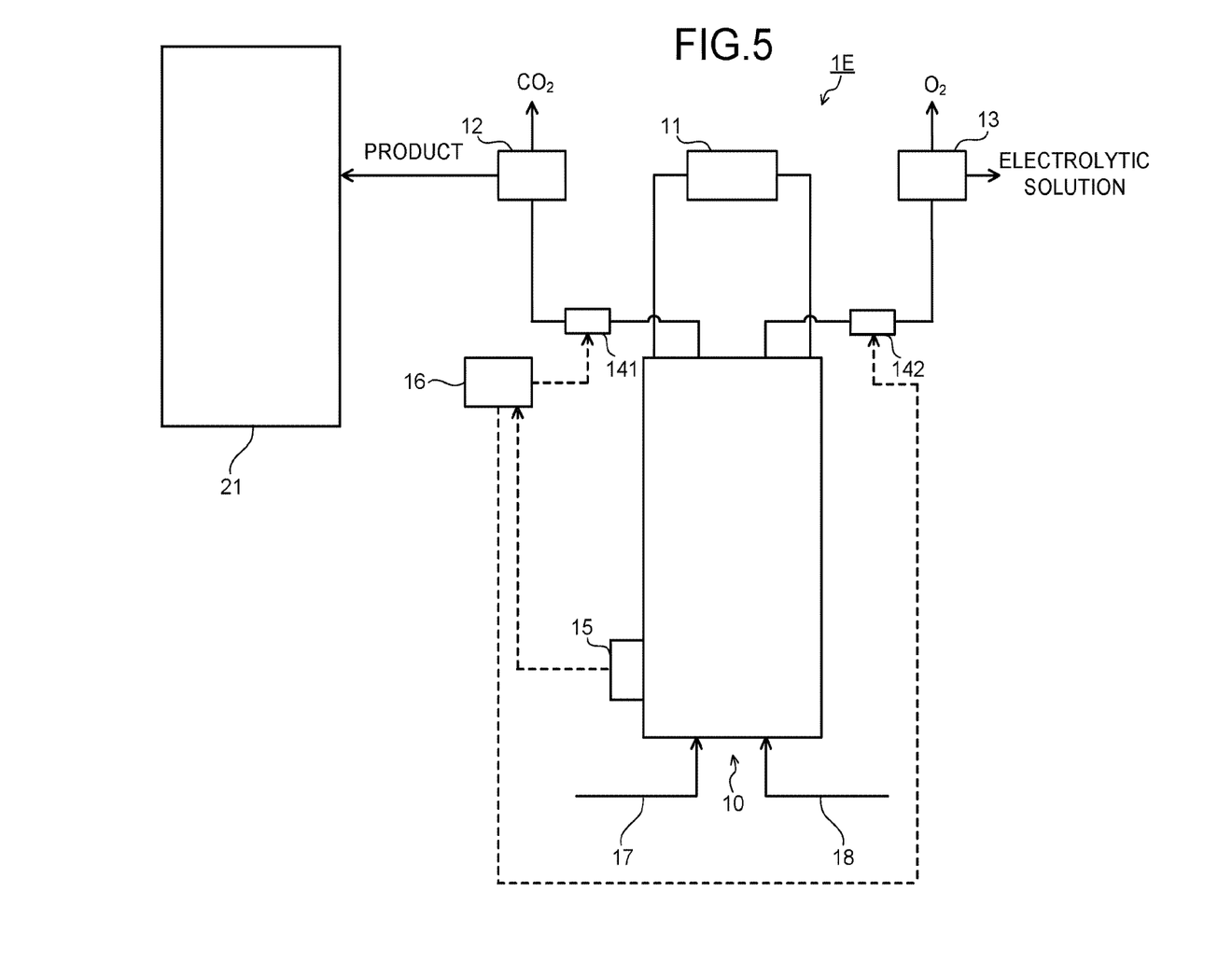
FIG. 5 is a diagram illustrating an electrochemical reaction device 1E.

FIG. 5 is a diagram illustrating an electrochemical reaction device 1E. This embodiment can be appropriately combined with other embodiments, and explanations of the same components as those of the electrochemical reaction device 1A to the electrochemical reaction device 1D can be appropriately cited.

The electrochemical reaction cell 10 is, for example, any of the electrochemical reaction cells 10 illustrated in FIG. 1 to FIG. 4. A second reactor 21 can be connected to the first reactor 7 of the electrochemical reaction cell 10. The second reactor 21 is connected in order to further make a product obtained by reducing carbon dioxide at the first reactor 7 react. The second reaction unit 21 is not particularly limited as long as the reduction product produced at the first reactor 7 can be made react with other substances, and the reaction of the reduction product includes reactions such as a chemical reaction, an electrochemical reaction, and a biological conversion reaction by algae, enzyme, yeast, bacteria, and the like. In the cases of the chemical reaction, the electrochemical reaction, the biological conversion reaction by bacteria or the like, at least one parameter between reaction efficiency and a reaction rate improves when the temperature is higher than room temperature. When the reduction product introduced into the second reactor 21 is introduced at temperature of 60° C. or more and 150° C. or less, energy conversion efficiency of the electrochemical reaction device 1E can be improved. The efficiency can be further improved when the reduction product is introduced into the second reactor 21 at the temperature of 60° C. or more and 100° C. or less because the reaction of the biological conversion reaction by bacteria or the like promotes the most efficiently at the temperature around 80° C. The temperature or pressure of the second reactor 21 may be increased by applying energy from the outside to improve the reaction efficiency.

The reduction product may include carbon dioxide, carbon monoxide, and hydrogen obtained by electrolysis of water. A hydrogen concentration can be arbitrary adjusted depending on uses. When hydrogen is used at the second reactor 21, carbon dioxide or the like is separated by the first separation unit 12 while remaining the reduction product and hydrogen as a mixture. When hydrogen is not used, only the reduction product is separated. When methanol or the like is produced, hydrogen as a side reaction can be used at the second reactor 21 as a valuable resource by regulating the hydrogen concentration to be approximately double with respect to the number of moles of carbon monoxide. On the other hand, at the first reactor 7, the hydrogen concentration of the reduction product can be adjusted within a range of 0.1% or more and 5% or less in volume percent by suppressing the side reaction of hydrogen. It is thereby possible to use the device as a carbon monoxide production device providing high concentration carbon monoxide.

EXAMPLES

Example 1

The electrochemical reaction device 1C illustrated in FIG. 3 was manufactured. First, changes in Faradaic efficiency and electrolysis efficiency were measured by controlling the pressures in the first room 3 and the second room 5 by using the electrochemical reaction device 1C when the temperature in the first reactor 7 increased.

A stainless reaction container was used as the first reactor 7. A PTFE porous membrane was disposed in the middle of the reaction container to separate between the first room 3 and the second room 5. One where a gold catalyst is supported on carbon particles on carbon paper was used as the cathode 8. One where iridium catalyst adheres to titanium mesh was used as the anode 9. A 0.1 M $KHCO_3$ aqueous solution was used for the second electrolytic solution to be supplied to the second room 5. Gas containing carbon dioxide was supplied to the first room 3. A DC stabilized power supply was used as the power supply 11 for a verification experiment and was connected to the cathode 8 and the anode 9. A temperature measuring thermocouple was used as the temperature detector 15. A relief valve was used as the pressure adjuster 14.

Electrolysis efficiency of a reduction product produced by a reduction reaction of carbon dioxide and potential dependence of pressure were evaluated in advance by measurement using a potentiostat. Gas components discharged from the cathode 8 side were analyzed by a gas chromatography apparatus. The gas components observed by the gas chromatography apparatus were carbon monoxide, hydrogen, and carbon dioxide. Then, the electrolysis efficiency over time of carbon monoxide produced at the cathode 8 was calculated. Faradaic efficiency of carbon monoxide (CO Faradaic efficiency) was calculated from the following expression. Note that a production rate of carbon monoxide (CO production rate) was obtained from the gas chromatography analysis result, and a value observed by an ammeter was used as a current value. Besides, the number of reaction electrons was set to 2.

[Mathematical Expression 1]

$$\text{CO FARADAIC EFFICIENCY [\%]} = \frac{\text{CO PRODUCTION RATE [mols]} \times \text{FARADAY CONSTANT} \times \text{NUMBER OF REACTION ELECTRONS}}{\text{CURRENT VALUE [A]}}$$

The result shows that the CO Faradaic efficiency has temperature dependence. When a current density of carbon dioxide reduction was 300 mA/cm², the electrolysis efficiency was 27% and the CO Faradaic efficiency was 85% at room temperature under the atmospheric pressure, but the electrolysis efficiency decreased to be 25% and the CO Faradaic efficiency decreased to 56% at 80° C. under atmospheric pressure. The electrolysis efficiency increased to 32% and the CO Faradaic efficiency increased to 84% when the conditions were adjusted by the first pressure adjuster 141 and the second pressure adjuster 142 to be 80° C. under 2 atm.

Comparative Example 1

In the electrochemical reaction device 1C as same as Example 1, changes in the CO Faradaic efficiency and the electrolysis efficiency were verified when pressure was changed at room temperature. It was found that the electrolysis efficiency and the CO Faradaic efficiency seldom changed when the pressure was adjusted to be 1 atm and 2 atm at room temperature.

It is clear from the above-described result that decreases in the electrolysis efficiency and the Faradaic efficiency due to temperature increase can be prevented to further enable higher efficiency by controlling at least one pressure between the pressure in the first room 3 and the pressure in the second room 5 based on the temperature in the first reactor 7.

Based on the above-described result, the power supply 11 using renewable energy was used and a reduction test of carbon dioxide was carried out. In this event, an amount and a composition of a product at the cathode 8 were monitored by operating a temperature monitor as the temperature detector 15, and a detection signal thereof was sent to the controller 16 to control the pressure adjuster 14. The result showed that, though there was a fluctuation in the temperature, it was verified that the fluctuations in the amount and the composition of the product at the cathode 8 were suppressed based on the regulation of the pressure in the first room 3.

Note that the above-described configurations in the embodiments are applicable in combination, and parts thereof are also replaceable. While certain embodiments have been described, these embodiments have been presented by way of example only, and are not intended to limit the scope of the inventions. Indeed, those embodiments may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction device comprising:
a first reactor including a first flow path forming a first room, a second flow path forming a second room, and a diaphragm, the first flow path being configured to allow a gas containing carbon dioxide to flow in an entirely gaseous stream, the second flow path being configured to allow a second electrolytic solution containing water to flow, and the diaphragm being disposed between the first and second flow paths;
a cathode facing on the first flow path, the cathode being configured to reduce the carbon dioxide and thus produce a reduction product;
an anode facing on the second flow path, the anode being configured to oxidize the water and thus produce an oxidation product;
a first pressure adjuster configured to adjust pressure in the first flow path;
a temperature detector on the first reactor, configured to detect a temperature of the physical exterior of the first reactor to form a detection signal; and
a controller configured to control the pressure adjuster in accordance with the detection signal from the temperature detector,
wherein the first pressure adjuster increases pressure in the first flow path in response to a detector signal from the temperature detector indicating an increase in temperature.

2. The device according to claim 1, wherein
the diaphragm has a porous membrane.

3. The device according to claim 1, comprising
a plurality of the first reactors.

4. The device according to claim 1, wherein
the detected temperature of the physical exterior of the first reactor is 60° C. or more and 150° C. or less.

5. The device according to claim 1, wherein
a concentration of the carbon dioxide to be introduced into the first room is 5% or more and 20% or less in volume percent, and pressure of the carbon dioxide to be introduced into the first room is 3 atm or more.

6. The device according to claim 1, wherein
a difference between the temperature of the physical exterior of the first reactor to be detected by the temperature detector and the temperature of the carbon dioxide to be introduced into the first room is within 20° C.

7. The device according to claim 1, wherein
the temperature of the carbon dioxide to be introduced into the first room is 80° C. or more and 140° C. or less.

8. The device according to claim 1, further comprising:
a second reactor connected to the first room and in which the reduction product reacts.

9. The device according to claim 8, wherein
the device is configured to supply the reduction product into the second reactor at a temperature of 60° C. or more and 150° C. or less.

10. The device according to claim 8, wherein
the reaction of the reduction product is a biological conversion reaction.

11. The device according to claim 10, wherein
the biological conversion reaction includes a reaction by enzyme, a reaction by yeast, a reaction by bacteria, or a reaction by algae.

12. The device according to claim 8, wherein
the reaction of the reduction product is a chemical reaction.

13. The device according to claim 1, wherein
the reduction product includes carbon dioxide, carbon monoxide, and hydrogen, and
a concentration of the hydrogen of the reduction product is 0.1% or more and less than 5% in volume percent.

14. The device according to claim 1, wherein
the pressure adjuster is configured to adjust the pressure in the first room to be 0.1 MPa or more and 6.4 MPa or less.

15. The device according to claim 1, further comprising:
a second pressure adjuster configured to adjust pressure in the second room.

16. The device according to claim 15, wherein
the first and second pressure adjusters are configured to adjust a difference between the pressures in the first and second rooms to be within 0.5 MPa.

17. The device according to claim 1, further comprising:
a power supply connected to the cathode and the anode.

18. The device according to claim 1, wherein
a current density of the cathode is 100 mA/cm$^2$ or more and 1.5 A/cm$^2$ or less.

19. The device according to claim 1, wherein
a concentration of the carbon dioxide to be introduced into the first room is 5% or more and 20% or less in volume percent.

\* \* \* \* \*